Nov. 6, 1956 F. L. STEVENS 2,769,576
DISPENSER FOR TILE LAYING CEMENT AND SIMILAR MATERIALS
Filed Sept. 25, 1953 4 Sheets-Sheet 1
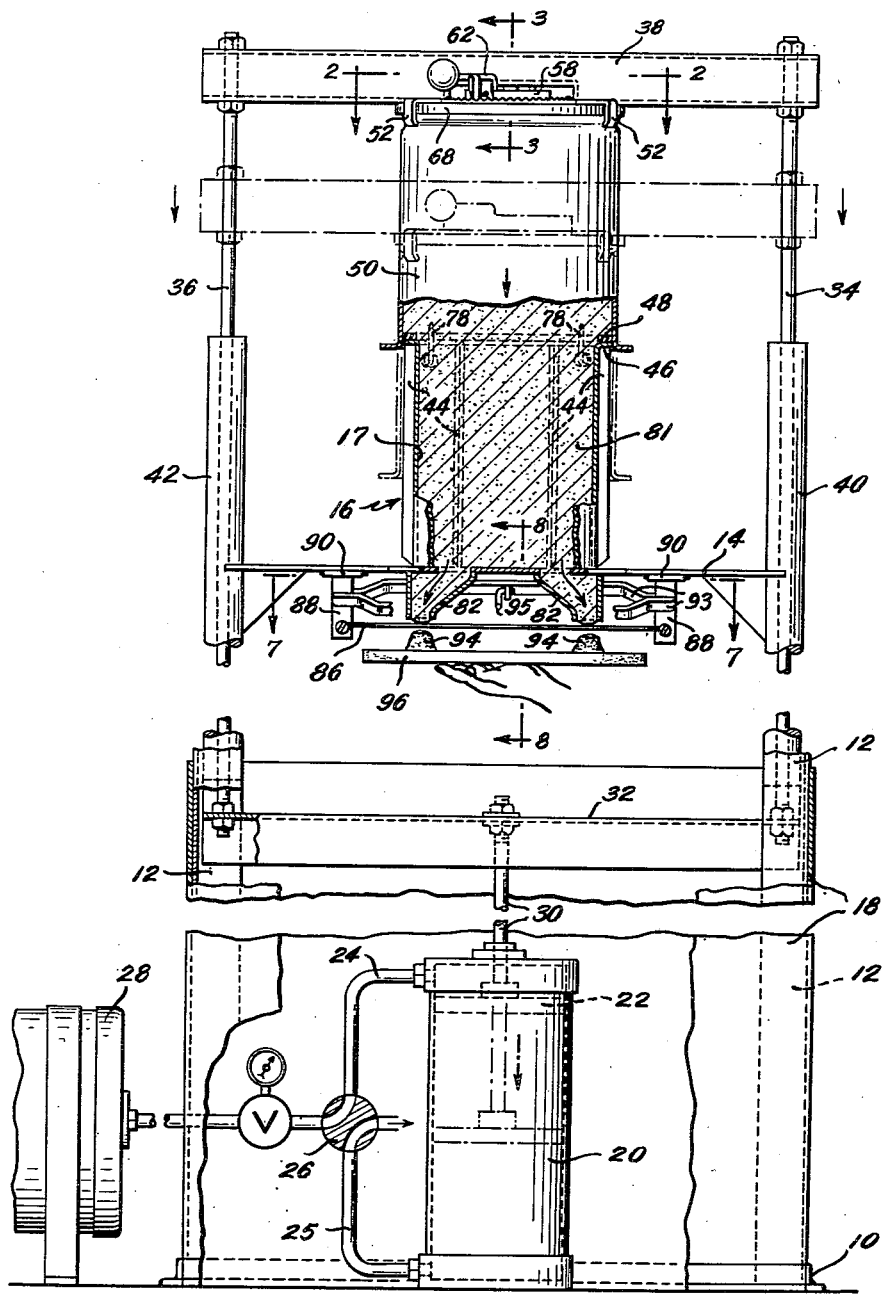
Inventor,
Frank L. Stevens,
by ⟨signature⟩ Atty.

Nov. 6, 1956  F. L. STEVENS  2,769,576
DISPENSER FOR TILE LAYING CEMENT AND SIMILAR MATERIALS
Filed Sept. 25, 1953  4 Sheets-Sheet 2
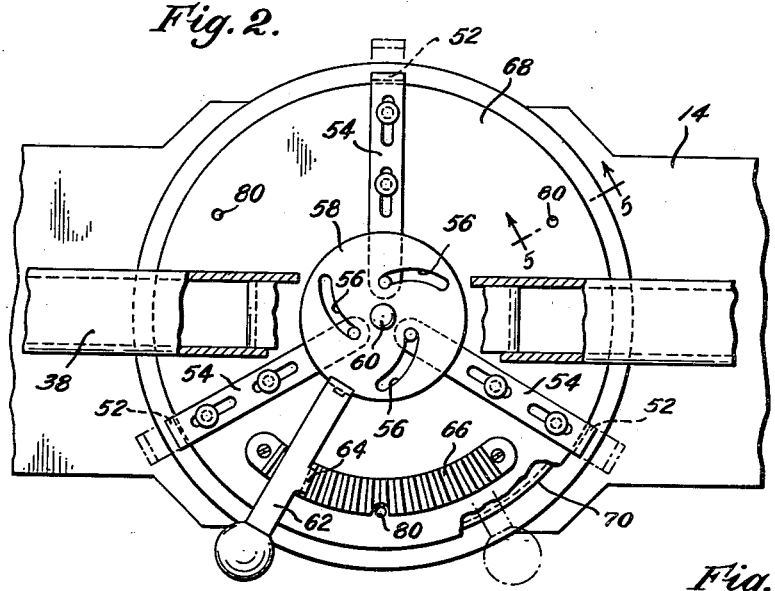
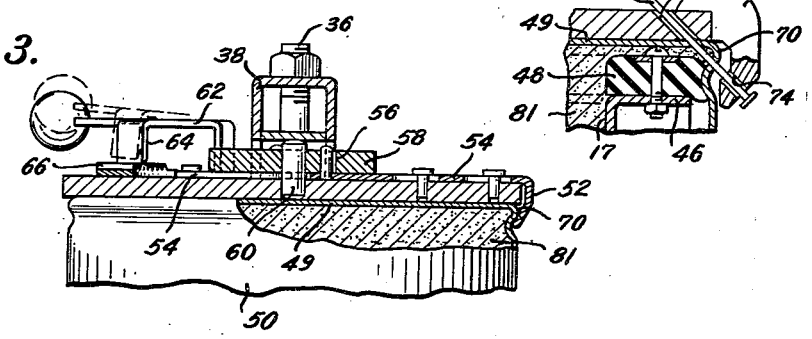
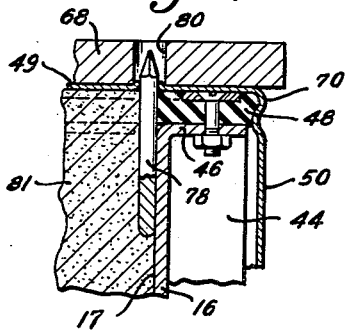
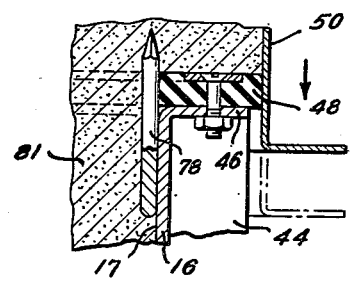
Inventor,
Frank L. Stevens,
by     Hulbert   Att'y.

Nov. 6, 1956  F. L. STEVENS  2,769,576
DISPENSER FOR TILE LAYING CEMENT AND SIMILAR MATERIALS
Filed Sept. 25, 1953  4 Sheets-Sheet 3

Inventor,
Frank L. Stevens,
by W. R. Hulbert Atty.

Nov. 6, 1956 F. L. STEVENS 2,769,576
DISPENSER FOR TILE LAYING CEMENT AND SIMILAR MATERIALS
Filed Sept. 25, 1953 4 Sheets-Sheet 4

Inventor,
Frank L. Stevens,
by *illegible* Atty.

United States Patent Office 2,769,576
Patented Nov. 6, 1956

2,769,576

DISPENSER FOR TILE LAYING CEMENT AND SIMILAR MATERIALS

Frank L. Stevens, Lexington, Mass., assignor to W. F. Webster Cement Company, Cambridge, Mass., a voluntary association of Massachusetts Application September 25, 1953, Serial No. 382,283

5 Claims. (Cl. 222—80)

This invention relates to apparatus for discharging or dispensing predetermined quantities of highly viscous materials, such as certain kinds of cement or adhesives of the type used in laying tiles or the like. More particularly, it concerns a new and improved power-operated dispenser of such materials which is portable and adapted for use on the job by the tile layer.

In applying tiles, such as insulating sound-absorbing linoleum or rubber tiles, a very viscous and adhering type of cement is employed. The cement usually is furnished in five-gallon cans and the tile layer opens the container on the job and applies the cement to each tile manually by means of a paddle. It is evident that this hand procedure is tedious and time consuming, due to the consistency of the material, and the operator quickly tires and consequently his production decreases as the day progresses. Furthermore, the quantity of cement applied to each tile and the tile area covered thereby are subject to wide variation because of the human factor. Due to the cost of skilled labor, the laying of tiles using the customary manual method of applying cement in recent years has become unduly expensive and would become increasingly so without a mechanical aid such as that here disclosed.

It has heretofore been proposed to provide a mechanical device for discharging adhesives of this type on the job, thus eliminating the hand method. However, so far as I am aware, such earlier devices have failed adequately to solve the problem of dispensing material having the consistency and characteristics of flow of modern cements which are employed for these purposes.

Tile cement is extremely viscous, tacky, reasonably quick-drying and virtually impossible to pump through a conduit except when heated to make it more fluent. My experience with these cements indicates that even high pressures will not, at ordinary room temperatures, force the same at a useful rate of flow through a relatively small conduit having an appreciable length. The strength of the container and conduit, etc., also places a practical limit on the range of pressures which may be employed. Consequently, a dispenser having such a lengthy conduit would need a heating element running substantially the entire length of the conduit in order to prevent clogging. Such heating equipment not only unduly increases the initial cost of the machine and the expense of operation thereof, but also renders the device undependable and inconvenient for use in some locations. Machines of this type, generally speaking, have been found impractical for on-the-job tile laying operations.

With the foregoing in mind, it is an object of my invention to provide a new and improved dispenser for tile laying cement or similar materials which is power operated and of simple and practical construction, completely overcoming the drawbacks and difficulties above referred to.

Another object of the invention is to provide a mechanical cement dispenser of the type described which is portable and capable of being set up directly on the tile laying job.

Still a further object of the invention is to provide a new and improved cement dispenser of the type described having a plurality of dispensing nozzles mutually spaced at predetermined intervals so as to deposit onto a tile quantities of cement at optimum distances from each other for maximum adherence.

Yet another object of the invention is to provide a new and improved apparatus of the type described having a plurality of discharge nozzles and optionally being provided with simple and effective means for severing predetermined quantities of the material as it leaves such nozzles for automatic or semi-automatic dispensing.

Yet another object of the invention is to provide a mechanical dispensing device for discharging very viscous materials from standard containers effectively, reliably, and without the need for steam jacketing of lengthy conduits, etc.

With the foregoing and other objects in view, in accordance with the invention, I provide a new and improved device for dispensing highly viscous material from a standard type of container capable of being opened substantially to its full area at one end while remaining closed at the other, the container having virtually the same internal cross section from end to end. My improved device comprises a hollow dispensing structure whose external transverse dimensions are slightly less than the corresponding internal dimensions of the container and providing a sizable internal dispensing chamber whose cross-sectional dimensions do not vary substantially from one end to the other and are not materially less than the corresponding dimensions of the container. Usually this structure will take the form of a cylinder whose internal chamber has a volume approximating that of the standard size cement container (usually five gallons) so as to be completely filled by the contents of one container, the cylinder having a length at least as great as that of the container and being provided with a circumferential opening into the chamber at one end. At its other end it is provided with a plurality of relatively short dispensing nozzles mutually spaced from each other by predetermined intervals and opening directly, without intermediate conduits, into the dispensing chamber. The open end of the chamber is surrounded by an outwardly directed circumferential sealing flange formed on the rim of the cylinder and adapted to enter the container. This flange is shaped to fit the internal wall of the container and carries a ring of suitable material, such as rubber, to provide a sealing fit. A forcing member is mounted opposite the open end of the cylinder a sufficient distance to permit the placing of the full container therebetween with the rim of the latter around the sealing flange of the cylinder, the forcing member having a portion adapted to engage the closed end of the container. Power mechanism is provided for moving the forcing member and dispensing cylinder toward each other with sufficient force to cause the wall of the container to pass over the sealing flange, in a controlled operation, so as to discharge cementitious material from the container through the circumferential opening into the chamber. Once the chamber has been initially filled, as additional thick viscous material is forced into one end thereof, an equal quantity will be displaced and discharged from the other end through the nozzles. In the presently preferred form of the invention, the dispensing structure comprises a reinforced cylinder, vertically mounted upon a fixed supporting member with the forcing member mounted for vertical movement thereabove. The nozzles open directly from the bottom of the dispensing chamber and a standard five-gallon container of cement may be opened and placed inverted over the top of the dispensing structure with its rim surrounding the sealing flange. The forcing member preferably forms one component of a yoke operated by a compressed air powered cylinder and piston controlled by a suitable controlling valve for raising and lowering the yoke. Means are provided for puncturing the bottom of the container when it has been completely emptied into the chamber to break the seal and permit removal of the same. The forcing member is provided with gripping elements which grasp the rim of the inverted bottom of the container for pulling the same upwardly from the dispensing structure, thereafter permitting replacement thereof with a fresh, full container of cement.

In a somewhat modified form of the invention the dispensing cylinder is double-walled providing a heating chamber surrounding the dispensing chamber. Heating elements are arranged in the heating chamber which holds a suitable heating liquid so as to elevate the temperature of the cement contained in the dispensing chamber. In this form of the invention less pressure is needed to discharge quantities of the same cement through the nozzles since the material is more fluent at higher temperatures. Similarly the quantities dispensed are more easily controlled and cut-off mechanism is usually unnecessary. Likewise I provide suitable electrical control circuits for the heating elements and compressed air unit responsive to temperature and pressure changes in the system.

Still further objects, features and advantages of the invention will become apparent from the following detailed description of a preferred embodiment thereof taken in connection with the accompanying drawings in which like numerals refer to like parts in the several views and in which:

Fig. 1 is a front elevation with portions broken away and partly in section of one embodiment of the invention, certain elements being shown diagrammatically;

Fig. 2 is a sectional view on an enlarged scale on line 2—2 of Fig. 1 showing one form of mechanism which may be used for gripping the inverted bottom of the cement container;

Fig. 3 is a fragmentary view partly in section corresponding to Fig. 2 taken on line 3—3 of Fig. 1;

Fig. 4 is a fragmentary sectional view of an alternate simplified form of gripping and puncturing device which may optionally be employed in lieu of the device shown in Figs. 2 and 3;

Figs. 5 and 6 are fragmentary detailed views of the puncturing device of Fig. 2 taken on line 5—5, Fig. 5 showing the container in an upper position and Fig. 6 showing the same emptied and punctured by the puncturing device;

Figure 7:
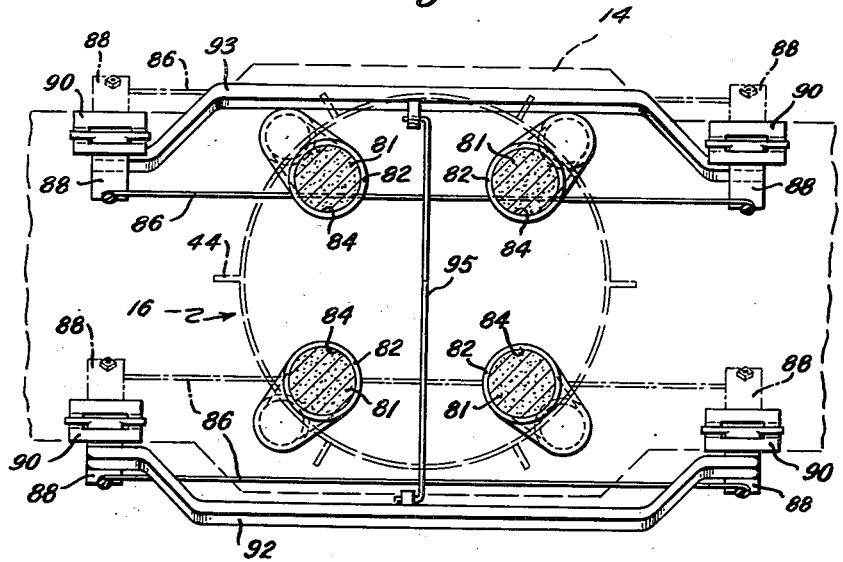
Fig. 7 is a plan view on an enlarged scale of the dispensing nozzles taken on line 7—7 of Fig. 1.
Figure 8:
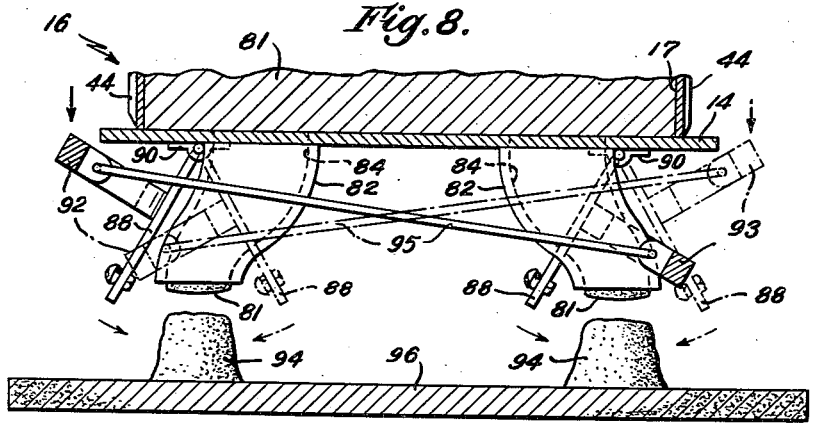
Fig. 8 is a vertical sectional view taken on line 8—8 of Fig. 1 showing the cut-off mechanism associated with the dispensing nozzles.
Figure 9:
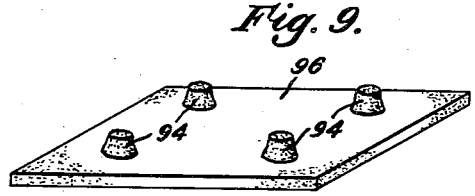
Fig. 9 is a view in perspective of a tile to which adhesive has been applied by means of my improved apparatus.

It will be observed from Fig. 1 that my improved cement dispenser is mounted upon a base 10 which may conveniently be provided with casters to permit shifting the device from place to place. Frame members 12, which may be angle irons, are mounted upon the base 10 and support a transverse platform 14 on which the dispensing structure 16 providing a cylindrical dispensing chamber 17 is fixedly mounted. The lower portion of the device includes a housing 18, within which is mounted a compressed air operated cylinder 20 and piston 22. Both ends of the cylinder 20 are connected through pipes 24 and 25 to a four-way valve 26, operable by a handle or a treadle or by automatic means (not shown). This valve may be moved to connect one of the pipes 24 and 25 to a source of compressed air 28 while venting the other to atmosphere, or to a neutral position in which neither is connected to the compressed air and hence the piston remains stationary. In the present embodiment I have shown the compressed air source as an auxiliary pressure tank. However, it may be found desirable and practical to mount an electrically or gasoline driven compressed air unit in the housing 18 for supplying the compressed air. It will be observed that the piston will be forced downwardly when the upper end of the cylinder 20 is supplied with compressed air, while at the same time the lower end of the cylinder is vented. In another position of the valve, the upper end of the cylinder is vented and the lower end is placed under pressure and the piston is forced upwardly. In an intermediate position of the valve 26 neither pipe 24 nor 25 is connected to the air supply and in such neutral position the piston 22 will not be driven in either direction. The valve may be operated manually or by a treadle or an automatic device may be connected thereto for causing it to operate repeatedly at predetermined intervals and with predetermined steps.

To the piston 22 is attached a connecting rod 30 which in turn is bolted to the lower transverse member 32 of the yoke comprising the member 32, vertical rods 34 and 36, extending upwardly from either end of the member 32, and an upper transverse forcing member 38 which is mounted between the upper ends of the two rods 34 and 36. The forcing member 38 is thus capable of being reciprocated vertically by movement of the piston 22 and the rods 34 and 36 are supported and guided within the stationary sleeves 40 and 42 which are attached to a fixed portion of the machine.

The dispensing structure 16 comprises a metallic cylinder having reinforcing ribs 44, which also serve to prevent tilting of the cement container in its descent, the upper end thereof being entirely open with the adjacent wall turned outwardly into a sealing flange 46 carrying a rubber gasket 48.

As shown in Figs. 2 and 3, the transverse beam or forcing member 38 carries a clamping assembly arranged to grip the rim of the inverted bottom 49 of a cement container 50 which, after being opened, is placed with its mouth over the gasket 48. In the form of clamping mechanism shown in Figs. 2 and 3, three hooks 52 are mounted upon a system of levers and cams for clamping movement in a radial direction in a horizontal plane. Each hook depends from a clamping bar 54. The three clamping bars have their inner ends received in cam slots 56 formed in a plate 58, which may pivot about a pin 60 upon movement of the lever arm 62. The lever arm 62 carries a dog 64 which co-acts with the ratchet 66 mounted upon the pressure plate 68 which engages the bottom of the container 50. When the lever arm 62 is in the position shown in full lines in Fig. 2, all the bars 54 are drawn toward the center and the hooks 52 will securely grip the rim 70 of the inverted bottom of the container 50. When the lever 62 is in the position shown in broken lines in Fig. 2, the hooks 52 likewise assume the position shown in broken lines in this figure, disengaged from the rim of the container bottom.

It is evident that the rim-clamping mechanism above described may assume any one of a number of forms. For example, in certain cases, in the interest of economy, the cam, lever and ratchet systems may be dispensed with and in its place there may be provided a simple series of hooks 52a, as shown in Fig. 4, which are sufficiently loosely held to pass over the rim 70. When the container 50 has been forced completely down over the cylinder 16, as it is shown in Fig. 4, and its entire contents have been discharged into the chamber 17, in order to break the seal and permit air to enter the container so it can be readily removed, a nail 72 may be driven through the hole 74 provided in each hook 52a, through the side wall of the container 16 and its bottom 49 and thence through an aligned opening 76 in the disc 68.

The nails 72 serve not only to break the seal and prevent the formation of a vacuum when the container is lifted, but also temporarily to couple the hooks 52a to the rim 70 so that when the yoke and forcing member 38 are raised, they will lift the empty container with them, drawing the same clear of the gasket 48.

In the more elaborate clamping mechanism of Figs. 2 and 3, the seal is broken by a fixed puncture pin 78 which is welded to the wall of the cylinder 16, as seen in Figs. 5 and 6.

In Fig. 6 the container 50 has reached its lowermost position with the bottom 49 resting on the rubber sealing ring 48 and the puncture pin 78 having pierced the bottom 49 to permit the entry of air so that the container may be lifted. The pressure plate 68, which is attached to the forcing member 38, is provided with a clearance hole 80 for receiving the point of the puncture pin 78.

Referring now to Figs. 1, 7–9, the mode of discharge of cement or other highly viscous material, indicated by the numeral 81, will now be described. The cylinder 16 at its lower end is provided with four abbreviated nozzles 82 which open directly into the chamber 17 with the shortest convenient distance between the openings into the chamber and the discharge orifices 84 of the nozzles. The spacing of these discharge orifices is determined with regard to the dimensions of the tiles 96 to which cement is to be applied. Since, in most cases, these tiles are of standard dimensions, the nozzles are arranged accordingly so that the cement deposited upon each tile will spread to cover the undersurface thereof in the most effective manner.

Preferably, I provide a simple device for cutting off a discharged portion of cement simultaneously from each nozzle. While any suitable cut-off device may be used, in the present embodiment of the invention I have shown a pair of swinging wires 86, which are mounted upon arms 88 pivoted on hinges 90 to the underside of the support 14. The cut-off wires 86 are operated by either lever 92 or 93 which are connected to each other by the link 95 alternately shifting from the position shown in full lines in Fig. 8 to another position shown in broken lines. Each time the lever 92 or 93 is swung, each wire 86 passes simultaneously across a pair of the four orifices 84, severing adhesive material which has been discharged therethrough but which is still clinging to material remaining within the nozzles. The discharged cement is shown as deposited in small heaps 94 on the surface of the tile 96 held beneath the nozzles by the operator.

In the operation of this embodiment of my novel dispenser, I first charge the cylinder 16 completely by discharging therein a whole container 50 of cement. It will be evident that the contents of one container must first be used to fill the chamber 17 before the dispensing operation may be commenced. Next, I take a second container and, having removed the cover, I invert it and place it manually with its rim surrounding the sealing ring 48. Operating the valve 26, I then admit air under pressure to the upper end of the cylinder 20, thereby forcing the piston 22 and connecting rod 30 downwardly, pulling with it the transverse bar 32 and the forcing member 38, thereby forcing the container 50 down over the cylinder 16 to a sufficient extent to extrude through the nozzles 82 any desired quantity of cement. Since the extruded cement will not fall free from the nozzles of its own accord, the operator may press the tile 96 against the extruded material, thereby pulling it free, or, in the alternative, he may hold the tile in a position directly beneath the nozzles and operate the cut-off wires 86 to sever the extruded portions of material from the main body thereof. Optionally, I may provide automatic controls on my dispenser so that the valve 26 may be caused to operate repeatedly at predetermined intervals and for predetermined distances, thus lowering the yoke and forcing the container 50 down in a step-by-step operation. With such automatic controls, the operator may devote his entire time to presenting tiles to the cement discharge nozzles in succession and handing them to a tile layer with no need to control the movements of the machine.

As already indicated, I have found that in order for such a device as the present to operate successfully, it is essential that the chamber 17 have a cross-sectional area not materially different from that of the container 50. Thus, when the cement is forced into the cylinder 16, it is constricted to the least possible degree and a minimum of pressure is required to fill the chamber. Thus, in this embodiment, I form the cylinder 16 of an internal diameter which is smaller than the internal diameter of the container 50 only by the necessary thickness of the container wall and strengthening ribs 44, which fit within the container 50 as the latter is forced down over the cylinder.

Similar considerations are applicable to the width, proportions and shape of the nozzles 82. These nozzles must open directly into the chamber 17 and there should be the shortest possible distance between the inlet and outlet of each nozzle. The reason for this is, as stated earlier in this specification, that extremely difficult, sticky and viscous materials, such as tile-laying cement, can be forced at room temperatures through a small conduit of appreciable length only by means of enormous pressure above practical limits. For example, it would be well nigh impossible at room temperature to force the material through the nozzles if they were extended to conduct the cement to a point remote from the cylinder. The material can be pumped from one place to another if made more fluent by heating, but steam-jacketing the dispensing cylinder and any conduit therefrom is both expensive and undependable and does not afford a practical solution.

Figure 10:
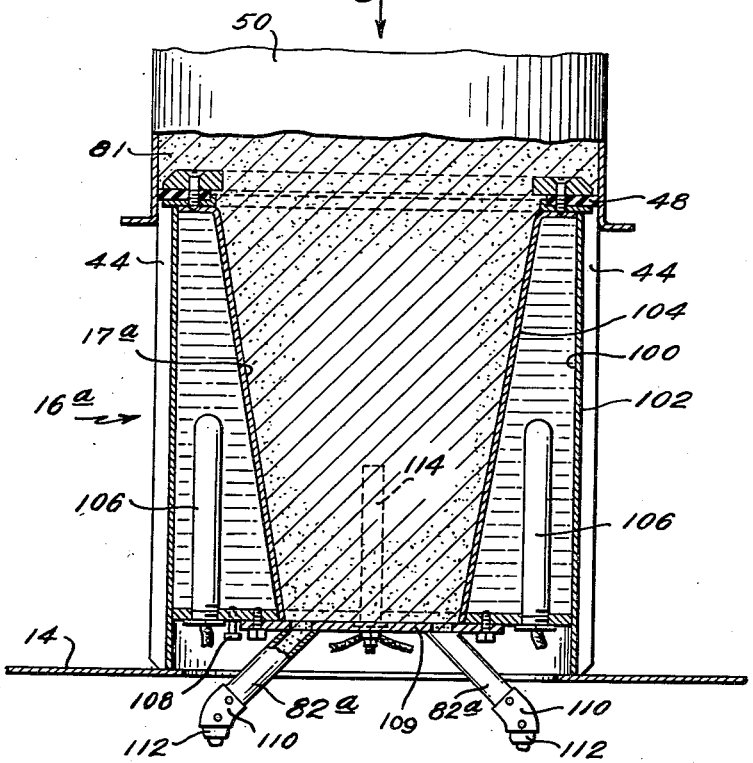
Fig. 10 is a vertical sectional view of a portion of a modified embodiment of the invention including a heating unit for the dispensing cylinder.
Figure 11:
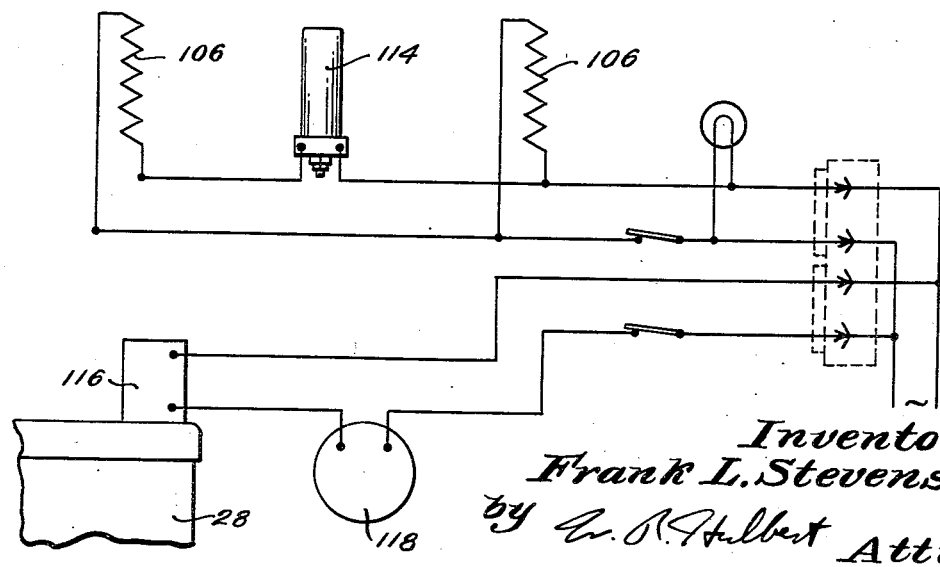
Fig. 11 is a diagram showing the electrical components employed in the embodiment of Fig. 10.

In Fig. 10 I have illustrated another embodiment of my new and improved cement applicator and in Fig. 11 I have shown electrical circuitry for controlling the operation of the same. In this embodiment I have included simple and effective means for heating the dispensing cylinder and its contents for improving the flow thereof.

As seen in Fig. 10, the dispensing cylinder 16a is double-walled so as to provide an annular chamber 100 between the cylindrical outer wall 102 and the inner wall 104, which defines the dispensing chamber 17a. Mounted in the chamber 100 are one or more heating units 106 which are in contact with a liquid medium for transferring the heat to the inner wall 104. A suitable liquid for this purpose, I have found, is ethylene glycol or some other antifreeze liquid having suitable characteristics. As a safety precaution, I provide a fuseable plug 108 for releasing the contents of the chamber 100 in case of overheating.

It will be observed that the chamber 17a in this form of the invention is somewhat tapered but still generally cylindrical and nevertheless of internal dimensions approximating those of the container 50. While, because of the heating of the material, it is made more fluent, nevertheless the same considerations for securing good results still apply to this embodiment of the invention. A plate 109 closes the bottom of the chamber 17a and the cement is discharged through nozzles 82a which are provided with sleeves 110 and outlet tips 112, the latter being removable and replaceable should they become clogged.

The temperature of the ethylene glycol liquid is regulated by a thermostat 114 inserted in the cement dispensing chamber 17a. This thermostat controls the heaters 106 maintaining them at a proper temperature so as to raise or lower the temperature of the ethylene glycol, in turn controlling the temperature of the cement.

In connection with the electrical circuits, I have also shown an arrangement for controlling the pressure in the air tank 28, including a pressure-operated switch 116 which controls the operation of the compressor motor 118.

The great advantage of the embodiment according to Fig. 10 is that it is operated electrically, has no long steam-jacketed conduits and hence can be used on most tile-laying jobs. It has particular advantages for use in cold weather in unheated locations. It is economical in its current requirements since the cement need not be heated to any great degree, a temperature of the order of ordinary room temperature or a few degrees above being sufficient in most instances. With some types of cement which are more viscous and which may require more heat to increase their flow, higher temperatures may be necessary.

I have found that a tile-laying team, using the novel dispenser according to my invention, can lay many more tiles per day and with less fatigue than heretofore has been possible by hand methods. The equipment may be made rigid and durable, employing standard air-compressing apparatus, sufficiently light and portable so as to be taken directly to the job and used in any area where tiles are to be laid.

While I have herein described and disclosed a presently preferred embodiment of the invention, it will nevertheless be understood that the same is susceptible of numerous modifications and changes by those skilled in the art without departure from the principle and mode of operation thereof and nevertheless within the spirit and scope of the appended claims.

I claim:

1. Apparatus for dispensing highly viscous material from a cylindrical container open at one end and closed at the other end, said apparatus comprising a hollow dispensing cylinder of slightly less external diameter than said container providing a substantially cylindrical dispensing chamber, said chamber having a length and volume at least approximating that of said container, and being adapted to be initially filled with said material, a fixed mounting supporting said cylinder upright at a predetermined location, said cylinder having a circumferential opening into said chamber at its upper end and a plurality of relatively short dispensing nozzles mutually spaced from each other by predetermined intervals opening directly from said chamber at its lower end, said cylinder further having a circumferential circular external sealing flange about said circumferential opening adapted to enter said container and to fit the internal wall thereof with a sealing fit, a forcing member mounted above said circumferential opening, said member being adapted to engage the closed end of said container, mechanism for forcing said member downwardly toward said cylinder thereby to force the wall of said container over said flange and to discharge material from said container through said circumferential opening into said chamber while simultaneously extruding material from said chamber through said nozzles.

2. Apparatus in accordance with claim 1 including means for piercing said container bottom when the container has reached its lowermost position.

3. Apparatus for dispensing highly viscous material from a cylindrical container open at one end and closed at the other end, said apparatus comprising a hollow dispensing cylinder of slightly less external diameter than said container providing a generally cylindrical dispensing chamber, said chamber having a volume approximating that of said container, a length at least as great as that of said container, and being adapted to be initially filled with said material, a fixed mounting supporting said cylinder upright at a predetermined location, said cylinder having a circumferential opening into said chamber at its upper end and a plurality of relatively short dispensing nozzles mutually spaced from each other by predetermined intervals opening directly from said chamber at its lower end, said cylinder further having a circumferential circular external sealing flange about said circumferential opening adapted to enter said container and to fit the internal wall thereof with a sealing fit, a forcing member mounted above said circumferential opening, said member being adapted to engage the closed end of said container, mechanism for forcing said member downwardly toward said cylinder thereby to force the wall of said container over said flange and to discharge additional material from said container through said circumferential opening into said chamber while simultaneously extruding material from said chamber through said nozzles, and gripping members mounted on said forcing member for gripping the rim of the inverted bottom of said container.

4. Apparatus in accordance with claim 3 including means for piercing the bottom of said container when in its lowermost position surrounding said cylinder.

5. Apparatus for dispensing highly viscous material from a cylindrical container open at one end and closed at the other end, said apparatus comprising a hollow dispensing cylinder having double walls and of slightly less external diameter than said container, said walls defining a tapered internal dispensing chamber surrounded by a separate annnular heating chamber for holding a liquid medium, said dispensing chamber having a volume approximating that of said container, a length approximating that of said container, and being adapted to be initially filled with said material, a fixed mounting supporting said cylinder upright at a predetermined location, said cylinder having a circumferential opening into said dispensing chamber at its upper end and a plurality of relatively short dispensing nozzles mutually spaced from each other by predetermined intervals opening directly from said dispensing chamber at its lower end, said cylinder further having a circumferential circular external sealing flange about said circumferential opening adapted to enter said container and to fit the internal wall thereof with a sealing fit, a forcing member mounted above said circumeferntial opening, said member having a portion adapted to engage the closed end of said container, mechanism for forcing said member downwardly toward said cylinder thereby to force the wall of said container over said flange and to discharge additional material from said container through said circumferential opening into said dispensing chamber while simultaneously extruding material from said chamber through said nozzles, gripping members mounted on said forcing member for gripping the rim of the inverted bottom of said container, and heating elements in said heating chamber and controls therefor operating in response to the temperature within said dispensing chamber.

References Cited in the file of this patent

UNITED STATES PATENTS

| | | |
|---|---|---|
| 548,457 | Pratt | Oct. 22, 1895 |
| 1,039,980 | Lowe | Oct. 1, 1912 |
| 2,562,081 | Beaudot | July 24, 1951 |
| 2,726,793 | Jacobson | Dec. 13, 1955 |